(No Model.)
O. B. PANCOST.
HAY PRESS.
No. 461,768.  Patented Oct. 20, 1891.
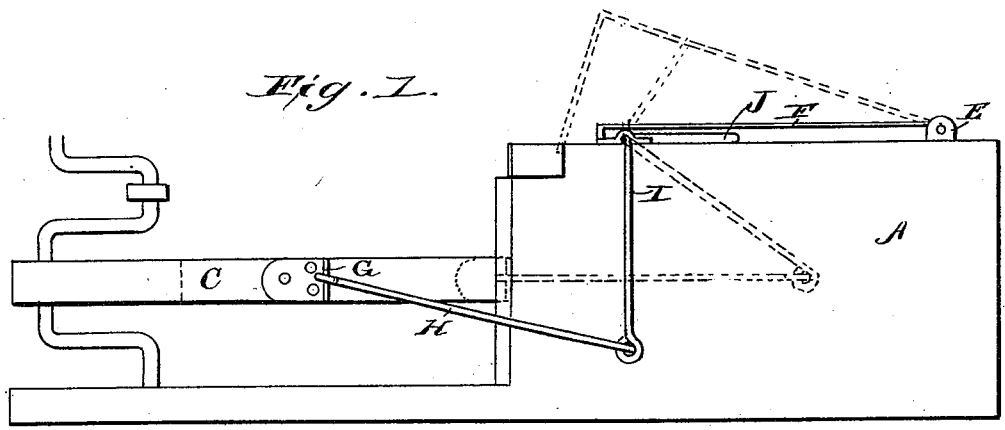
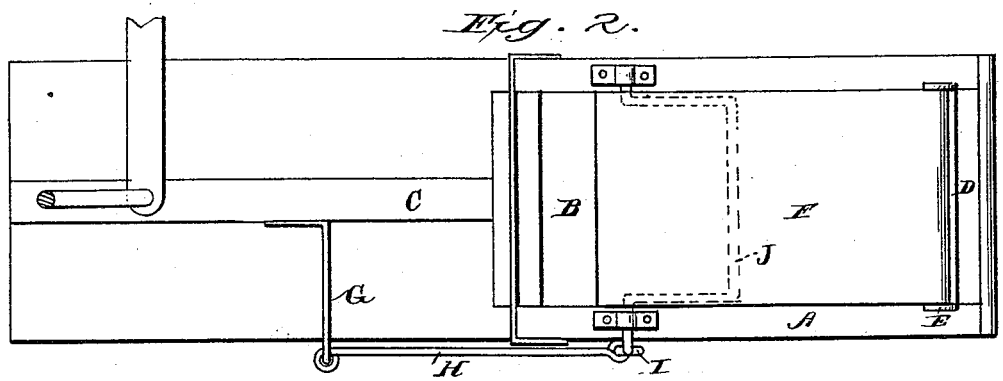
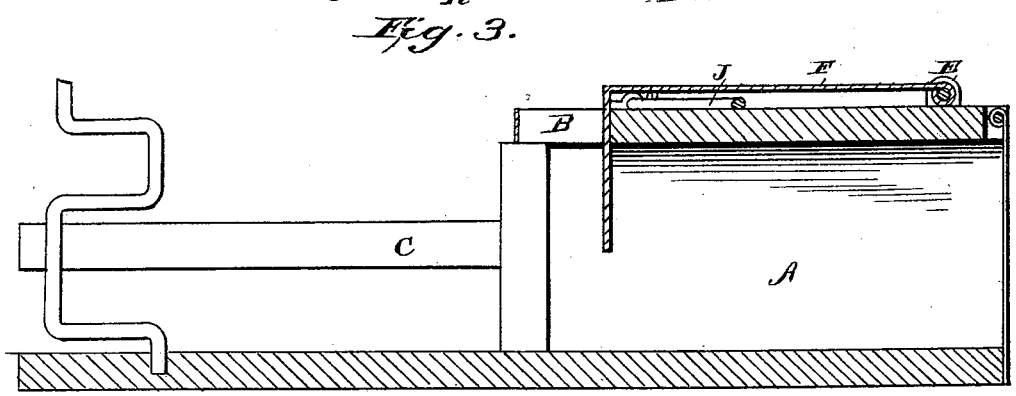
WITNESSES:
A. J. Schwartz
C. S. Frye
O. B. Pancost
INVENTOR
BY W. F. Fitzgerald & Co.
ATTORNEYS.

UNITED STATES PATENT OFFICE.

OREN BERT PANCOST, OF VALMONT, COLORADO.

HAY-PRESS.

SPECIFICATION forming part of Letters Patent No. 461,768, dated October 20, 1891.

Application filed April 24, 1891. Serial No. 390,297. (No model.)

*To all whom it may concern:*

Be it known that I, OREN BERT PANCOST, a citizen of the United States, residing at Valmont, in the county of Boulder and State of Colorado, have invented certain new and useful Improvements in Hay-Presses; and I do hereby declare the following to be a full, clear, and exact description of the invention, such as will enable others skilled in the art to which it appertains to make and use the same.

My invention relates to improvements in hay-presses; and it consists in certain novel features hereinafter described and claimed.

Referring to the accompanying drawings, Figure 1 is a side view of a press provided with my improvements. Fig. 2 is a plan view. Fig. 3 is a detail longitudinal section.

Referring to the drawings by letter, A designates the press-box, of the usual or any preferred construction, having an ordinary feed-opening B in its top, as clearly shown, and C is the plunger which is operated by any suitable mechanism. On the upper side of the press-box, and in rear of the feed-opening, I secure the bracket D, having the standards or lugs E at its ends, and between the said standards I pivot the L-shaped vibratory plate F, which extends forward over the feed-opening and has its front end extended downward through said opening into the press-box. On the side of the plunger, at an intermediate point of the same, I secure or provide the lateral projecting arm G, which is connected by a pitman H with the lower end of a crank-arm I, extending downward from the end of the rock-shaft J, which is journaled on the upper side of the press-box and has the central portion bent upward, so as to bear against the under side of the vibratory arm or plate F, as clearly shown.

The construction and arrangement of the several parts of my device being thus made known, the operation and advantages of the same will be readily understood. The plunger is reciprocated in the usual manner and the operator stands upon the operating plate or arm F to feed the hay into the press-box. The weight of the operator serves to throw the said plate or arm downward, so that it will bear on the rock-shaft and will enter the press-box to prevent the pressed hay from expanding and so rebounding into the feed-opening. As the plunger is forced into the press-box it will push the pitman H rearward, so as to rotate the rock-shaft and throw the central bent portion of the same upward, thereby lifting the vibratory arm or plate out of the path of the hay and the plunger, so that the hay can readily pass through the press. Upon the return stroke of the plunger the rock-shaft will be rotated in a contrary direction and the weight of the operator will at once throw the vibratory arm into the press-box, so that the pressed hay will be prevented from expanding and rebounding into the feed-opening, and also folding down the loose ends of the hay, consequently preventing the plunger becoming clogged so as not to operate freely.

It will be seen from the foregoing description that I have provided a very simple device by which the hay will be formed into compact and neat bales and the vibratory arm positively operated so as to facilitate the formation of the bales. The tucker or vibratory plate F, it will be seen, can be applied to almost all forms of hay-presses, and is the leading feature of my invention.

Having thus described my invention, what I claim, and desire to secure by Letters Patent, is—

The combination, with the press-box A and plunger C, of the L-shaped plate pivoted to the press-box, as shown, with its forwardly-bent end extended into the feed-opening B, the cranked arm I, journaled in bearings on the press-box with its cranked end extended beneath the L-shaped plate F, and the pitman H, connecting the cranked arm I with the plunger C, all constructed and arranged substantially as shown and described.

In testimony whereof I affix my signature in presence of two witnesses.

OREN BERT PANCOST.

Witnesses:
CHAS. M. CAMPBELL,
EDWARD AULTREY.